United States Patent
Chien

(10) Patent No.: US 7,257,454 B2
(45) Date of Patent: Aug. 14, 2007

(54) DYNAMICALLY ADJUSTING THE DISTRIBUTION FOR DISPATCHING LOT BETWEEN CURRENT AND DOWNSTREAM TOOL BY USING EXPERTISE WEIGHTING MECHANISM

(75) Inventor: Wen-Chi Chien, Houlong Township, Miaoli County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 428 days.

(21) Appl. No.: 10/719,721

(22) Filed: Nov. 21, 2003

(65) Prior Publication Data

US 2005/0113955 A1    May 26, 2005

(51) Int. Cl.
G06F 19/00 (2006.01)
G06F 9/46 (2006.01)
G05B 15/00 (2006.01)
G05B 13/00 (2006.01)

(52) U.S. Cl. .................. 700/101; 700/9; 700/28; 700/96; 700/99; 700/108; 700/121; 718/100

(58) Field of Classification Search .............. 700/9, 700/19, 28, 32, 83, 95–97, 99–103, 105, 700/108, 121; 718/100, 102–106
See application file for complete search history.

(56) References Cited

U.S. PATENT DOCUMENTS

| | | | |
|---|---|---|---|
| 5,444,632 A * | 8/1995 | Kline et al. | 700/100 |
| 5,751,580 A * | 5/1998 | Chi | 700/101 |
| 5,768,133 A | 6/1998 | Chen et al. | 364/468.01 |
| 5,826,238 A | 10/1998 | Chen et al. | 705/8 |
| 6,128,588 A | 10/2000 | Chacon | 703/6 |
| 6,259,959 B1 | 7/2001 | Martin | 700/99 |
| 6,470,227 B1 | 10/2002 | Rangachari et al. | 700/95 |
| 6,564,113 B1 | 5/2003 | Barto et al. | 700/99 |
| 6,842,655 B1 * | 1/2005 | Collins | 700/101 |
| 2002/0107714 A1 | 8/2002 | Whitlock et al. | |
| 2002/0108077 A1 | 8/2002 | Havekost et al. | |
| 2002/0111146 A1 | 8/2002 | Fridman et al. | |
| 2002/0111172 A1 | 8/2002 | DeWolf et al. | |
| 2002/0111739 A1 | 8/2002 | Jandrell | |

(Continued)

OTHER PUBLICATIONS

"Understanding the Fundamentals of Kanban and Conwip Pull Systems Using Simulation," Marek, et al., Proceedings of the 2001 Winter Simulation Conf., pp. 921-929, found on the web site www.informs-cs.org, Jun. 12, 2003.

Primary Examiner—Kidest Bahta
Assistant Examiner—Sean Shechtman
(74) Attorney, Agent, or Firm—Haynes and Boone, LLP

(57) ABSTRACT

A system and method that prioritizes product lots for fabrication and dispatching to manufacturing equipment establishes priorities for dispatching product lots based on a criticality factor and establishes a priority for dispatching product lots to manufacturing equipment based on processing capability and the efficiency of manufacturing equipment. A computer integrated manufacturing system executes a program process that functions as a lot dispatcher and a priority factor calculator. The lot dispatcher is in communication with an order entry system to receive requests for fabrication and with a process information system to receive procedures defining which manufacturing equipment is required. A manufacturing information system provides the lot dispatcher with a criticality factor and a queue level for each piece of manufacturing equipment. Then the current group of pieces of manufacturing equipment is followed with a balanced loading.

15 Claims, 3 Drawing Sheets

U.S. PATENT DOCUMENTS

| | | |
|---|---|---|
| 2002/0112026 A1 | 8/2002 | Fridman et al. |
| 2002/0130886 A1 | 9/2002 | Baldwin |
| 2002/0135618 A1 | 9/2002 | Maes et al. |
| 2002/0138184 A1 | 9/2002 | Kipersztok et al. |
| 2002/0138358 A1 | 9/2002 | Scheer |

* cited by examiner

DYNAMICALLY ADJUSTING THE DISTRIBUTION FOR DISPATCHING LOT BETWEEN CURRENT AND DOWNSTREAM TOOL BY USING EXPERTISE WEIGHTING MECHANISM

BACKGROUND OF THE INVENTION

1. Field of the Invention

This invention relates generally to manufacturing systems. More particularly, this invention relates to computer integrated manufacturing systems that dynamically dispatches product lots for fabrication to subsequent equipment in a manufacturing line.

2. Description of Related Art

In competitive manufacturing environments such as fabrication of electronic integrated circuits on substrates, delivery to a committed schedule is one of the most important factors to the operation of the enterprise. However, the tool utilization and quality of the fabrication of the product are almost equally important. The balancing of the loading of equipment or tooling of the various stages of the manufacturing lines of the enterprise must be considered.

Often to accommodate a "hot lot" or a lot having a very high priority for fabrication, the necessary manufacturing equipment may be idled or have its scheduling minimized to allow acceptance of the "hot lot" upon arrival. In other instances, the operators may not have a complete understanding of the flow of the product through the manufacturing line and may cause certain equipment to lack product lots for processing or may cause other equipment to have a backlog or long queue of product waiting for the equipment. Supervisors generally observe multiple units or pieces of manufacturing equipment within the manufacturing line and are able to determine if there is no queue or a too long a queue for individual pieces of equipment. The supervisors then communicate changes in the priorities of the lots set for processing in an attempt to adjust the distribution of the queues of the manufacturing equipment.

The operators must then interpret the instructions of the supervisors to attempt to adjust the distribution of the product lots for processing. Often there is a misunderstanding or miscommunication between an operator and the supervisor or the operator makes a mistake in the operation of the equipment. The operator does not react quickly to the instruction or does not comprehend the instructions and the fabrication of the product is further delayed.

U.S. Pat. No. 6,564,113 (Barto, et al.), describes a Lot start agent that calculates virtual WIP time in a multi-product and multi-bottleneck manufacturing environment. A system and method are provided for calculating virtual WIP time ("VWIP"). The system and method provide for the calculation of one or more bottleneck VWIP values.

U.S. Pat. No. 6,470,227 (Rangachari, et al.), describes a method and the apparatus for automating a microelectric manufacturing process by configuring application objects that implement a domain knowledge for a piece of equipment and then implementing a workflow. The method is embodied in a computer program that is part of a computer system U.S. Pat. No. 6,259,959 (Martin) describes a method for determining the performance components of a manufacturing line. A process for optimizing a manufacturing line including raw processing times of a plurality of work centers; summing the work center raw processing times, determining work center cycle times, dividing the work center cycle times by respective ones.

U.S. Pat. No. 6,128,588 (Chacon) describes an integrated wafer fab time standard (machine tact) database An integrated wafer fab production characterization and scheduling system incorporates a manufacturing execution system with a scheduling system based on simulation. The system provides a simulation tool integrated with the manufacturing execution system to evaluate proposed production control logic. Also included are: integration of preventive maintenance scheduling, Kanban based WIP control, an integrated time standard database, and real time lot move updates.

U.S. Pat. No. 5,826,238 (Chen, et al.) describes a method and system that operates a data processing system. This includes a data base computer system and a resource allocation computer for control of resource allocation. The method has several steps including: deriving data from the storage means and computing the targets for each of the stages; obtaining machine capacity data from the data storage means and employing the machine capacity data for allocating machine capacity proportionally and adjusting targets.

U.S. Pat. No. 5,768,133 (Chen, et al.) describes a WIP/move management tool for semiconductor manufacturing plant and method of operation thereof. This interactive data processing system and/or method is a management tool for a manufacturing plant including a shop floor control system. A server contains a data engine for extracting data, a load and transform data unit, and a database management storage unit. The database management storage unit supplies data to an interactive graphic user interface.

DETAILED DESCRIPTION OF THE INVENTION

In order to provide fabrication of product lots from a manufacturing line within an enterprise to meet committed schedules, the lots must be scheduled to dispatch each tool or piece of manufacturing equipment expeditiously. Further, to avoid having either long waiting or queuing times and having pieces of manufacturing equipment that are "starving" or have no queue, the scheduling must account for both the amount of product to be immediately processed and the capacity, capability, and present queue length of pieces of manufacturing equipment following the current piece of manufacturing equipment.

Figure 1:
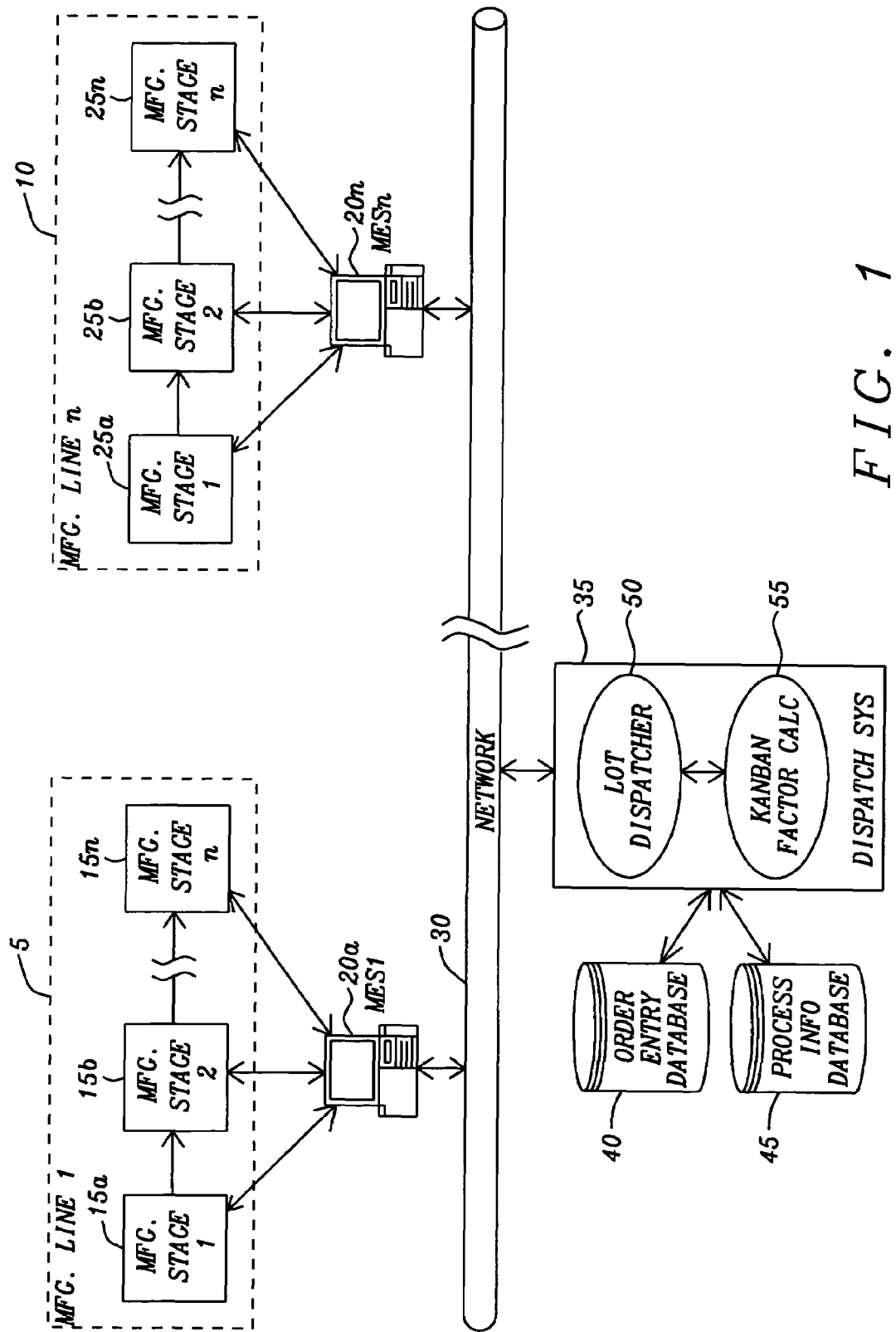
FIG. 1 is a diagram illustrating a manufacturing enterprise with a computer integrated manufacturing system that provides a product lot dispatching system of this invention.

Refer now to FIG. 1 for a description of a manufacturing enterprise that dispatches product lots to the pieces of manufacturing equipment using the dispatching system of this invention. The manufacturing enterprise has multiple manufacturing lines 5 and 10. In the example of an integrated circuits manufacturing enterprise, each manufacturing line 5 and 10 is a semiconductor processing line.

The manufacturing lines 5 and 10 each have a series of workstations or manufacturing stages $15a, 15b, \ldots, 15n$ and 25a, 25b, . . . , 25n. Each of the manufacturing stages 15a, 15b, . . . , 15n and 25a, 25b, . . . , 25n has multiple tools or pieces of manufacturing equipment each of which perform various processes in the fabrication of the product lots. In the capital intensive operation, as in the integrated circuit fabrication example, many of the pieces of manufacturing equipment are extremely expensive and must be utilized to their fullest. However, as noted before, those product lots that have a high priority for delivery must be processed expeditiously to meet the committed schedules.

Each of the pieces of manufacturing equipment within each of the manufacturing stages 15a, 15b, . . . , 15n and 25a, 25b, . . . , 25n is in communication with the manufacturing execution systems 20a, . . . , 20n. The manufacturing execution systems 20a, . . . , 20n provide control and scheduling for each of the manufacturing stages 15a, 15b, . . . , 15n and 25a, 25b, . . . , 25n. Further, the manufacturing stages 15a, 15b, . . . , 15n and 25a, 25b, . . . , 25n transmit a status of the product lot's progress or work-in-process (WIP) status describing the advancing of the product lot through the manufacturing stages 15a, 15b, . . . , 15n or 25a, 25b, . . . , 25n.

The manufacturing execution systems 20a, . . . , 20n are in communication with the computer integrating network 30 which allows the manufacturing execution systems 20a, . . . , 20n to communicate with the necessary control and information systems to allow for dispatch and scheduling of product lots to the manufacturing lines 5 and 10.

The dispatch system 35 has a lot dispatcher 50 and a Kanban factor calculator 55. The lot dispatcher 50 is in communication with the order entry database 40 and the process information database 45. The order entry database 40 provides a listing of the product lots to be fabricated. With the listing of the product lots are linkages or pointers to the process information database 45. The process information database 45 provides a description of the recipe for the fabrication of the product and thus a process flow describing the required manufacturing equipment required to produce the product. The dispatch system 35 is further in communication with the manufacturing execution systems 20a, . . . , 20n to receive the status of the fabrication of all product lots, a criticality factor for each piece of manufacturing equipment, and a queue level for each piece of manufacturing equipment.

The lot dispatcher is in communication with the Kanban factor calculator 55 to provide the listing of product lots being fabricated, the order of the execution of the process necessary to produce the product lots and the manufacturing equipment used to perform the processes. The status of each lot, the criticality factor of each piece of manufacturing equipment being employed in the process of each product lot, and the queue level of each piece of manufacturing equipment following the current piece of manufacturing equipment processing each of the product lots. The Kanban factor then creates a measure of the priority necessary to balance the loading such that the product lot is processed at an expeditious time for on-time delivery.

Figure 2:
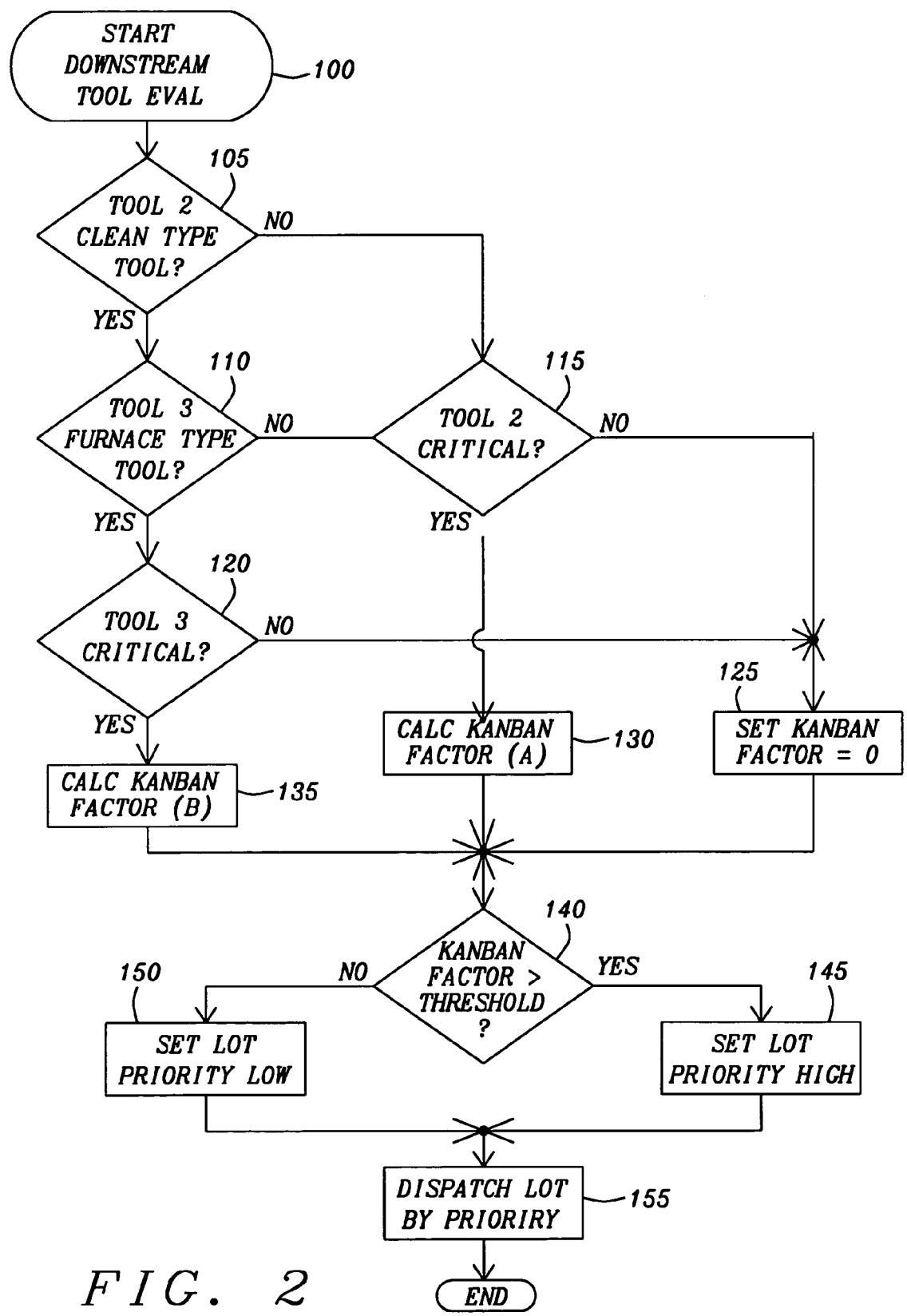
FIG. 2 is an example of a routing diagram illustrating the status and factors of the manufacturing equipment to be employed in the fabrication of particular product lots that provide the necessary information for the determining of a Kanban or priority factor of this invention.

While one stage of the manufacturing stages 15a, 15b, . . . , 15n or 25a, 25b, . . . , 25n is performing its step in the execution of the procedures for fabrication of the product lot, the dispatch schedule for the next stage of the product lot is determined by the method as shown in FIG. 2. The lot dispatcher 50 starts the evaluation (Box 100) of the load balancing, efficiency, and capacity by testing (Box 105) the type of tool of a group of the pieces of manufacturing equipment immediately following the piece of manufacturing equipment for which the product lots are being scheduled. If the group of immediately following pieces of manufacturing equipment is of a first type, in the example of the integrated circuit processing, the type of manufacturing equipment could be a cleaning tool that removes contaminants from substrates during the processing. The lot dispatcher 50 then tests (Box 110) the type of tool of the group of pieces of manufacturing equipment that is the next following or third group of pieces of manufacturing equipment following the piece of manufacturing equipment executing is procedure for the fabrication of the product lot. In this instance, the test (Box 110) is to determine if the next following piece of manufacturing equipment is of a second type. In the example of integrated circuit processing, the type of the piece of manufacturing equipment would be, for illustration, a processing furnace. The criticality factor the group of the next piece of equipment is evaluated (Box 115), if either the group of the following pieces of manufacturing equipment is not of the first type or the group of next following pieces of manufacturing equipment is not of the second type. If the criticality factor the group of the following pieces of manufacturing equipment is low and the group of the following pieces of equipment does not have an impact on the time for processing of the product lot, the Kanban factor is set (Box 125) to zero.

Alternately, if the criticality factor of the group of the following pieces of manufacturing equipment is high and the group of the following pieces of equipment has an impact upon the time to process of the product lot, the Kanban factor calculator 55 determines (Box 130) a first priority or first Kanban level for the Kanban factor by the formula:

$$KF\_1 = \frac{WIP\_c}{TOOL\#\_c * PPH\_c * EFF\_c} \quad (A)$$

where:
KF_1 is the first priority level or Kanban level for of a product lot entering a group of current pieces of manufacturing equipment.
WIP_c is a number of items within all product lots in queue for the group of first following pieces of manufacturing equipment.
TOOL#_c is a number of pieced of equipment within a group of the first following pieces of manufacturing equipment.
PPH_c is the average number of items of product capable of being manufactured by each piece of the group of the first following pieces of manufacturing equipment. In the illustration the capability of the manufacturing equipment would be in wafers per hour or (WPH) for a piece of substrate cleaning equipment.
EFF_c is an efficiency factor for the group of the first following pieces of manufacturing equipment.

If the group of the following piece of manufacturing equipment is of the first type and the group of next following pieces of manufacturing equipment are of the second type, the criticality factor of the group of next following pieces of manufacturing equipment is evaluated (Box 120). If the criticality factor of the group of next following pieces of manufacturing equipment is low and group of next following pieces of manufacturing equipment does not have an impact on the time for processing of the product lot, the Kanban factor is set (Box 150) to zero.

On the other hand, if the criticality factor of the group of next following pieces of manufacturing equipment is high and group of next following pieces of manufacturing equipment has an impact upon the time for processing the product lot, the Kanban factor calculator 55 determines the Kanban factor at a second priority or Kanban level determined (Box 135) by the formula:

$$KF\_2 = \frac{WIP\_cd + INPR\_cd + WIP\_d}{TOOL\#\_d * PPH\_d * EFF\_d}$$

where:
KF_2 is the second priority or Kanban level for of a product lot entering a current group of pieces of manufacturing equipment.
WIP_cd is a number of items within all product lots in queue for the group of first following pieces of manufacturing equipment and the group of second following pieces of manufacturing equipment.
INPR_cd is a number of items within all product lots in queue for the group of first following pieces of manufacturing equipment which are to proceed subsequently to the group of second following pieces of manufacturing equipment.
WIP_d is a number of items within all product lots in queue for the group of second following pieces of manufacturing equipment.
TOOL#_d is a number of pieced of equipment within a group of the second following pieces of manufacturing equipment.
PPH_d is the average number of items of product capable of being manufactured by the group of the second following pieces of manufacturing equipment. In the illustration the capability of the manufacturing equipment would be in wafers per hour or (WPH) for a piece of substrate cleaning equipment.
EFF_d is an efficiency factor for the group of the second following pieces of manufacturing equipment.

Upon completion of the calculations of the Kanban factor at either the first priority level or second priority level, the lot dispatcher 50 test (Box 140) the calculated Kanban factor for each of the product lots ready for dispatch to the next following group of pieces of manufacturing equipment. If the Kanban factor is greater than a threshold value, the lots are assigned (Box 145) a high priority for dispatch. Alternately, if the Kanban factor is less than a threshold value, the lots are assigned (Box 150) a low priority for dispatch. The lot dispatcher 50 then communicates a product lot dispatch instruction to each of the manufacturing execution systems 20*a*, . . . , 20*n* such that the product lots are appropriately dispatched (Box 155) to pieces of manufacturing equipment within the manufacturing stages 15*a*, 15*b*, . . . , 15*n* or 25*a*, 25*b*, . . . , 25*n*.

As would be understood by one skilled in the art, the lot dispatch system would be integrated and function as a program process within the manufacturing execution systems 20*a*, . . . , 20*n*. This program process may be incorporated within each of the manufacturing execution systems 20*a*, . . . , 20*n* or may, in a separate server system, provide support for the manufacturing execution systems 20*a*, . . . , 20*n*. The program process, when executed, causes the manufacturing execution system 20*a*, . . . , 20*n* executing the process to function as the dispatching system 35 as described. Further the program process is encoded as program code executable by the computer systems of the manufacturing execution systems 20*a*, . . . , 20*n* and is stored on a data retention media such as magnetic or optical disks, random access memory, or read only memory.

Figure 3:
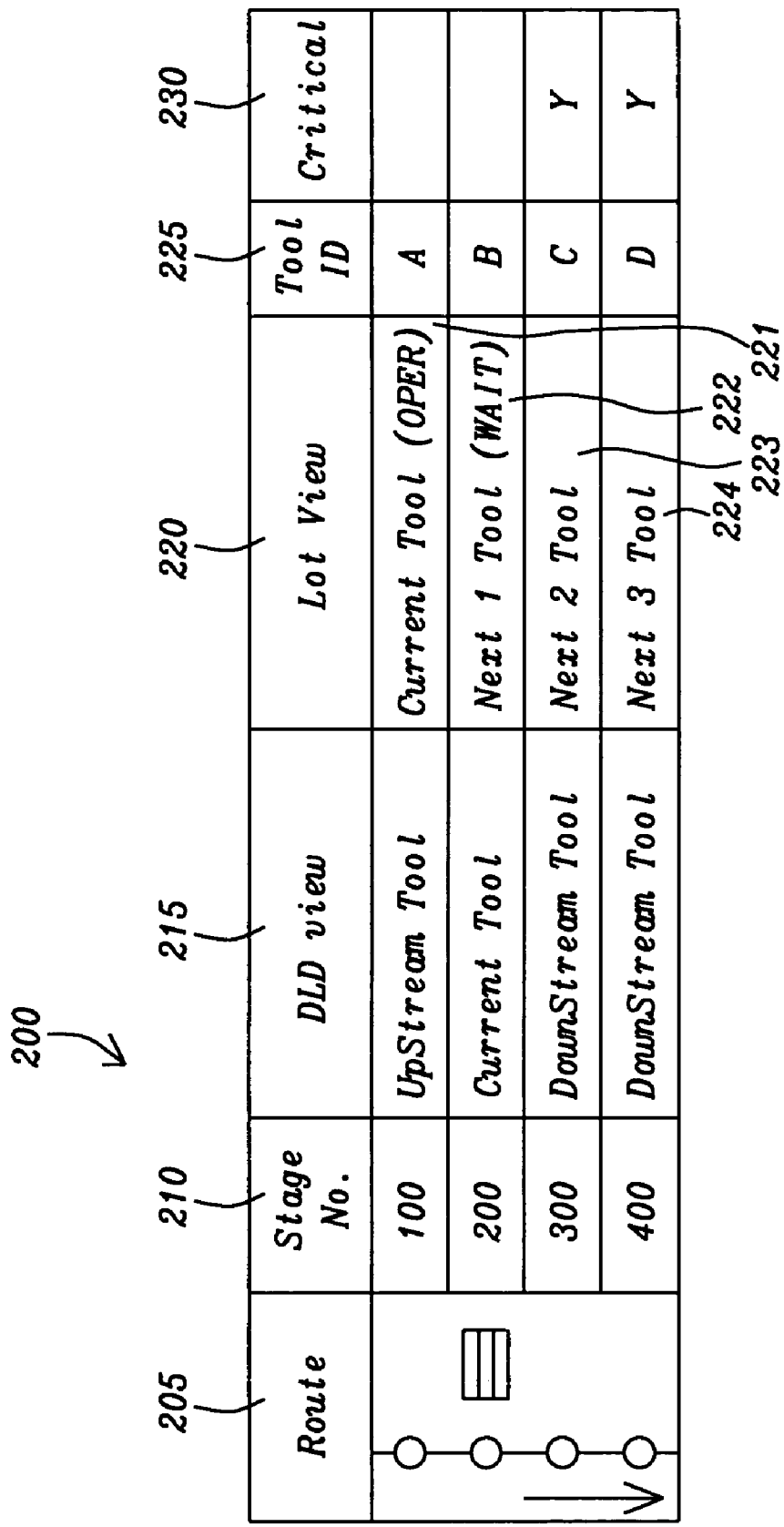
FIG. 3 is a flow chart of the method for determining the priority for dynamically dispatching product lots to manufacturing equipment of this invention.

The manufacturing execution systems 20*a*, . . . , 20*n* maintain a manufacturing information database as shown in FIG. 3, and provide the appropriate product lot status and criticality factor to the dispatch system 35. The manufacturing information database 200 illustrates the routing 205 for each product lot as it progresses through the pieces of equipment of each of the manufacturing stages 15*a*, 15*b*, . . . , 15*n* or 25*a*, 25*b*, . . . , 25*n*. The stage number is the designator for each manufacturing stage 15*a*, 15*b*, . . . , 15*n* or 25*a*, 25*b*, . . . , 25*n* though which a given product lot is to progress. In the illustration shown, the product lot is in one of the pieces of equipment of the manufacturing stage 210 designated 100. The database 200 shows the dispatch view 215 and the lot view 220. The dispatch view 215 exemplifies the lot dispatcher view where current tool (200) is the piece or group of pieces of manufacturing equipment that is to receive the product lot or lots upon completion. The downstream tools are the following and next following pieces of manufacturing equipment in the succession of the process of the product lot. The lot view 220 shows the location of the product lot within each stage or the manufacturing stages 15*a*, 15*b*, . . . , 15*n* or 25*a*, 25*b*, . . . , 25*n*. The current tool 221 is performing the operation necessary for the current step of the process for the fabrication of the product lot. For instance, in an integrated circuit fabrication, if the piece of manufacturing equipment is a cleaning tool, the substrate will have contaminants and undesired process material removed. Alternately, if the piece of manufacturing equipment is a furnace, the substrate is subjected to an operation such as diffusion of material into the surface of the substrate. The next tool 222 is following in the process for which the dispatch schedule is being created, The next two tools 223 and 224 are the subsequent tools for which their capabilities, capacities, and queues are to be balanced in the dispatch the next tool 222. The tool identification 225 provides the designation of the group of pieces of manufacturing equipment that is required in the recipe of the process for the product lot. The criticality factor 230 is a designation of the impact of the usage of the piece of manufacturing equipment on the time involved to process the product lot and the impact the piece of equipment has on in the flow of product lots through the manufacturing lines 5 and 10. In this example there are two criticality levels, none or the group of pieces of manufacturing equipment does not have an impact on the processing time as indicated by a blank entry. The group of pieces of manufacturing equipment may be critical to the processing of the product lot as indicated by the Y. Alternately, if there is a long queue of product lots waiting for the particular piece of manufacturing equipment, the whole manufacturing line 5 or 10 may be slowed, thus delaying delivery of product lots in a timely fashion.

While this invention has been particularly shown and described with reference to the preferred embodiments thereof, it will be understood by those skilled in the art that various changes in form and details may be made without departing from the spirit and scope of the invention.

The invention claimed is:

1. A system for dispatching of at least one product lot for processing to a plurality of pieces of manufacturing equipment arranged in groups within processing stages of a manufacturing line, said system comprising:
   a lot dispatcher in communication with an order entry system to receive requests for fabrication of a product lot, in communication with a process information system to receive procedures defining which pieces of manufacturing equipment are required for said fabrication of said product lot, and in communication with a manufacturing information system to dynamically receive a status of said fabrication of said product lot, a criticality factor for each piece of manufacturing equipment, and a queue level for each piece of manufacturing equipment that follows a current group of pieces of manufacturing equipment required for said product lot; and a priority factor calculator in communication with said lot dispatcher to receive a listing of said defined pieces of manufacturing equipment required for said fabrication of said product lot, said criticality factor, and said queue level, for determining a priority factor for said product lot such that each group of pieces of manufacturing equipment following said current group of pieces of manufacturing equipment has a balanced loading and said product lot is processed at an expeditious time for on-time delivery;

wherein:

if groups of first following pieces of manufacturing equipment have a criticality factor of a first level, said priority factor has a first priority level, and if groups of first following pieces of manufacturing equipment are of a first type and if groups of second following pieces of manufacturing equipment are of a second type, said priority factor has a second priority level; and wherein:

said priority factor calculator determines said first priority factor level by the formula:

$$KF\_1 = \frac{WIP\_c}{TOOL\#\_c * PPH\_c * EFF\_c}$$

where:

KF_1 is said first priority level for a product lot entering a group of current pieces of manufacturing equipment WIP_c is a number of items within all product lots in a queue for the group of first following pieces of manufacturing equipment, TOOL#_c is a number of pieces of equipment within a group of the first following pieces of manufacturing equipment;

PPH_c is an average number of items of product capable of being manufactured by said group of the first following pieces of manufacturing equipment, EFF_c is an efficiency factor for said group of the first following pieces of manufacturing equipment.

2. The system for dispatching of claim 1 wherein if a magnitude of said first priority level achieves a threshold level, said product lot is immediately dispatched for processing.

3. The system for dispatching of claim 1 wherein if said second priority level achieves a threshold level, said product lot is immediately dispatched for processing.

4. The system for dispatching of claim 1 wherein if the group of first following pieces of manufacturing equipment has a criticality factor of a second level, said priority factor has a third priority level.

5. The system for dispatching of claim 4 wherein if said third priority level indicates that said product lot should not be immediately dispatched for processing, said product lot is placed on a queue of one of the first following pieces of manufacturing equipment.

6. The system for dispatching of claim 1 wherein if the group of first following pieces of manufacturing equipment is not of the first type, said priority factor has a fourth priority level.

7. The system for dispatching of claim 6 wherein if said fourth priority level indicates that said product lot should not be immediately dispatched for processing, said product lot is placed on one queue of one of the first following pieces of manufacturing equipment.

8. The system for dispatching of claim 1 wherein if the group of second following pieces of manufacturing equipment is not of the second type, said priority factor has a fifth priority level.

9. The system for dispatching of claim 8 wherein if said fifth priority level indicates that said product lot should not be immediately dispatched for processing, said product lot is placed on a queue of one of the first following pieces of manufacturing equipment.

10. The system for dispatching of claim 1 wherein if the group of first following pieces of manufacturing equipment is of the first type, and the group of second following pieces of manufacturing equipment is of the second type, and the group of second following pieces of manufacturing equipment has a criticality factor that is not the first level, said priority factor has a sixth priority level.

11. The system for dispatching of claim 10 wherein if said sixth priority level indicates that said product lot should not be immediately dispatched for processing, said product lot is placed on a queue of one of the first following pieces of manufacturing equipment.

12. The system for dispatching of claim 1 wherein said product lot is substrates onto which integrated circuits are fabricated.

13. The system for dispatching of claim 1 wherein said manufacturing equipment is integrated circuit processing equipment for the formation of integrated circuits upon substrates.

14. The system for dispatching of claim 13 wherein the integrated circuit processing equipment includes furnaces and substrate cleaning equipment.

15. A system for dispatching of at least one product lot for processing to a plurality of pieces of manufacturing equipment arranged in groups within processing stages of a manufacturing line, said system comprising:

a lot dispatcher in communication with an order entry system to receive requests for fabrication of a product lot, in communication with a process information system to receive procedures defining which pieces of manufacturing equipment are required for said fabrication of said product lot, and in communication with a manufacturing information system to dynamically receive a status of said fabrication of said product lot, a criticality factor for each piece of manufacturing equipment, and a queue level for each piece of manufacturing equipment that follows a current group of pieces of manufacturing equipment required for said product lot; and a priority factor calculator in communication with said lot dispatcher to receive a listing of said defined pieces of manufacturing equipment required for said fabrication of said product lot, said criticality factor, and said queue level, for determining a priority factor for said product lot such that each group of pieces of manufacturing equipment following said current group of pieces of manufacturing equipment has a balanced loading and said product lot is processed at an expeditious time for on-time delivery;

wherein:
if groups of first following pieces of manufacturing equipment have a criticality factor of a first level, said priority factor has a first priority level, and
if groups of first following pieces of manufacturing equipment are of a first type and if groups of second following pieces of manufacturing equipment are of a second type, said priority factor has a second priority level; and wherein:
said priority factor calculator determines said second priority level by the formula:

$$KF\_2 = \frac{WIP\_cd + INPR\_cd + WIP\_d}{TOOL\#\_d * PPH\_d * EFF\_d}$$

where:
KF_2 is said second priority level for a product lot entering a current group of pieces of manufacturing equipment WIP_cd is a number of items within all product lots in queue for the group of first following pieces of manufacturing equipment and the group of second following pieces of manufacturing equipment, INPR_cd is a number of items within all product lots in queue for the group of first following pieces of manufacturing equipment which are to proceed subsequently to the group of second following pieces of manufacturing equipment, WIP_d is a number of items within all product lots in queue for the group of second following pieces of manufacturing equipment, TOOL#_d is number of pieces of equipment within a group of the second following pieces of manufacturing equipment;

PPH_d is an average number of items of product capable of being manufactured by said group of the second following pieces of manufacturing equipment, EFF_d is an efficiency factor for said group of the second following pieces of manufacturing equipment.

* * * * *